(12) United States Patent
Wang et al.

(10) Patent No.: US 11,003,562 B2
(45) Date of Patent: May 11, 2021

(54) COMPUTER-IMPLEMENTED METHOD, COMPUTER PROGRAM PRODUCT AND COMPUTING SYSTEM

(71) Applicant: EMC IP Holding Company, LLC, Hopkinton, MA (US)

(72) Inventors: Eric Leda Wang, Shanghai (CN);
Bruce Yunlong Yang, Shanghai (CN);
Shark Yiyang Liu, Shanghai (CN);
Forrest Weiyi Gu, Shanghai (CN);
Christopher J. Campetti, Lancaster, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 51 days.

(21) Appl. No.: 15/492,323

(22) Filed: Apr. 20, 2017

(65) Prior Publication Data

US 2017/0308450 A1    Oct. 26, 2017

(30) Foreign Application Priority Data

Apr. 25, 2016   (CN) .......................... 201610262843.8

(51) Int. Cl.
*G06F 11/00*   (2006.01)
*G06F 11/22*   (2006.01)
*G06F 9/4401*   (2018.01)

(52) U.S. Cl.
CPC ........ *G06F 11/2294* (2013.01); *G06F 9/4401* (2013.01); *G06F 9/442* (2013.01)

(58) Field of Classification Search
CPC ............ H04B 17/0085; G01R 31/2834; G01R 31/31718; G01R 31/318583; G01R 31/2882; G01R 31/31701; G01R 31/31903; G01R 31/31912; G06F 11/2294; G06F 11/3656; G06F 3/0674; G06F 11/2733; G06F 11/3688; H04L 67/025; H04L 67/12; H04W 64/00
See application file for complete search history.

(56) References Cited

U.S. PATENT DOCUMENTS

| | | | | |
|---|---|---|---|---|
| 6,112,276 A * | 8/2000 | Hunt | ....................... | G06F 3/061 711/112 |
| 6,304,839 B1 * | 10/2001 | Ho | .................... | G01R 31/31721 703/18 |
| 6,859,902 B1 * | 2/2005 | Dalal | ................. | G01R 31/2884 714/726 |
| 7,483,381 B1 * | 1/2009 | Hansen | ................... | H04L 43/50 370/241 |
| 7,760,769 B1 * | 7/2010 | Lovett | ................. | G06F 11/3656 370/535 |
| 8,000,656 B1 * | 8/2011 | Jiao | .................... | H04B 17/0085 455/423 |
| 8,583,973 B1 * | 11/2013 | Chakravarty | .... | G01R 31/31703 714/727 |

(Continued)

*Primary Examiner* — Loan L. T. Truong
(74) *Attorney, Agent, or Firm* — Brian J. Colandreo; Mark H. Whittenberger; Holland & Knight LLP

(57) ABSTRACT

A method, computer program product, and computing system for associating a local communications port on a local computing device with a DUT communications port on a Device-Under-Test. A user is enabled to remotely access the DUT communications port via the local communications port using a remote computing device.

18 Claims, 3 Drawing Sheets

(56) References Cited

U.S. PATENT DOCUMENTS

| | | | | |
|---|---|---|---|---|
| 8,661,397 B2* | 2/2014 | La Fever | | G01R 31/318536 716/136 |
| 8,713,333 B1* | 4/2014 | Selvaraj | | G11B 19/048 713/300 |
| 8,804,258 B1* | 8/2014 | Khanzode | | G11B 5/012 360/31 |
| 9,065,556 B2* | 6/2015 | Popescu | | H04B 17/0085 |
| 9,165,133 B2* | 10/2015 | La Fever | | G06F 21/44 |
| 9,183,071 B1* | 11/2015 | Estell | | G11B 20/1816 |
| 9,397,901 B2* | 7/2016 | Majumdar | | H04L 43/028 |
| 9,726,722 B1* | 8/2017 | Solt | | G01R 31/3177 |
| 2002/0039904 A1* | 4/2002 | Anderson | | H04W 64/00 455/456.1 |
| 2003/0121011 A1* | 6/2003 | Carter | | G01R 31/318314 716/106 |
| 2004/0102916 A1* | 5/2004 | Chen | | G06F 11/2284 702/117 |
| 2004/0102917 A1* | 5/2004 | Chen | | G06F 11/2221 702/120 |
| 2005/0235263 A1* | 10/2005 | Bundy | | G06F 11/263 717/124 |
| 2005/0262412 A1* | 11/2005 | Mukai | | G01R 31/318342 714/742 |
| 2006/0064266 A1* | 3/2006 | Mok | | H04W 24/06 702/117 |
| 2006/0170435 A1* | 8/2006 | Granicher | | G01R 1/07385 324/754.07 |
| 2006/0242499 A1* | 10/2006 | Volz | | G01R 31/3025 714/724 |
| 2007/0291658 A1* | 12/2007 | Knapik | | H04L 43/50 370/252 |
| 2008/0010568 A1* | 1/2008 | Kushnick | | H04L 43/50 714/724 |
| 2008/0039070 A1* | 2/2008 | Ptashek | | H04W 24/06 455/423 |
| 2008/0057914 A1* | 3/2008 | Fan | | H04W 24/06 455/414.1 |
| 2008/0262759 A1* | 10/2008 | Bosl | | G01R 31/31908 702/58 |
| 2009/0048800 A1* | 2/2009 | Hayes | | G01R 31/31907 702/119 |
| 2009/0248926 A1* | 10/2009 | Egy | | G06F 13/4022 710/104 |
| 2010/0218044 A1* | 8/2010 | Roblett | | H04L 43/50 714/32 |
| 2010/0324855 A1* | 12/2010 | Parker | | G06F 11/2294 702/119 |
| 2011/0107074 A1* | 5/2011 | Chan | | G06F 9/4406 713/2 |
| 2011/0305150 A1* | 12/2011 | Haver | | H04L 43/106 370/252 |
| 2011/0307233 A1* | 12/2011 | Tseng | | G06F 30/331 703/14 |
| 2012/0197582 A1* | 8/2012 | Richardson | | G06F 11/2294 702/122 |
| 2013/0091587 A1* | 4/2013 | La Fever | | G01R 31/318536 726/28 |
| 2014/0095931 A1* | 4/2014 | Sadasivam | | G06F 11/3664 714/28 |
| 2014/0236527 A1* | 8/2014 | Chan | | G01R 31/318307 702/119 |
| 2014/0237291 A1* | 8/2014 | Elston | | G06F 11/263 714/25 |
| 2014/0237606 A1* | 8/2014 | Futoransky | | G06F 21/577 726/25 |
| 2014/0250328 A1* | 9/2014 | Schnizler | | G06F 11/2733 714/31 |
| 2015/0244477 A1* | 8/2015 | Hirst | | H04B 17/15 455/67.14 |
| 2015/0253357 A1* | 9/2015 | Olgaard | | H04B 17/15 324/750.26 |
| 2015/0264590 A1* | 9/2015 | Michl | | H04W 24/06 455/67.14 |
| 2015/0276866 A1* | 10/2015 | Jindal | | G01R 31/318555 714/727 |
| 2016/0062865 A1* | 3/2016 | Tule | | G06F 11/321 714/30 |
| 2016/0169973 A1* | 6/2016 | Leclerc | | G01R 31/31718 702/119 |
| 2016/0253252 A1* | 9/2016 | Holzmann | | H04B 17/0085 714/31 |
| 2016/0275299 A1* | 9/2016 | Srinivasan | | H04W 4/21 |
| 2017/0370988 A1* | 12/2017 | Motika | | G01R 31/287 |
| 2018/0003764 A1* | 1/2018 | Menon | | H04W 4/80 |
| 2018/0077242 A1* | 3/2018 | Carl | | H04L 67/02 |
| 2018/0128873 A1* | 5/2018 | Petrov | | G01R 31/2834 |
| 2018/0211508 A1* | 7/2018 | Alkire | | G08B 21/185 |

* cited by examiner

COMPUTER-IMPLEMENTED METHOD, COMPUTER PROGRAM PRODUCT AND COMPUTING SYSTEM

RELATED APPLICATION

The subject application claims the priority of China Patent Application No. 201610262843.8, filed on 25 Apr. 2016, the contents of which are herein incorporated by reference in its entirety.

TECHNICAL FIELD

This disclosure relates to testing systems and, more particularly, to remote access testing systems.

BACKGROUND

Modern computing systems (such as data storage systems) are often complex and require testing and configuration during development. When testing and configuring such systems, access to the system in question is often required so that e.g., data signals can be provided to (and read from) various data ports included within the system being tested/configured. Unfortunately, the people that are testing/configuring the system may be located in regions geographically different from the system being tested/configured.

SUMMARY OF DISCLOSURE

In one implementation, a computer-implemented method is executed on a computing device and includes associating a local communications port on a local computing device with a DUT communications port on a Device-Under-Test. A user is enabled to remotely access the DUT communications port via the local communications port using a remote computing device.

One or more of the following features may be included. The user may be enabled to schedule access to the DUT communications port on the on Device-Under-Test. An API may be exposed that allows for the interfacing of a test program with the DUT communications port on the on Device-Under-Test. The user may be enabled to perform one or more of: powering up the Device-Under-Test; powering down the Device-Under-Test; and rebooting the Device-Under-Test. The Device-Under-Test may include one or more of: a storage processor; a disk array; and an IT device. The local communications port on the local computing device may include one or more of: a local serial port; and a local network port. The DUT communications port on the Device-Under-Test may include one or more of: a DUT serial port; and a IPMI network port.

In another implementation, a computer program product resides on a computer readable medium and has a plurality of instructions stored on it. When executed by a processor, the instructions cause the processor to perform operations including associating a local communications port on a local computing device with a DUT communications port on a Device-Under-Test. A user is enabled to remotely access the DUT communications port via the local communications port using a remote computing device.

One or more of the following features may be included. The user may be enabled to schedule access to the DUT communications port on the on Device-Under-Test. An API may be exposed that allows for the interfacing of a test program with the DUT communications port on the on Device-Under-Test. The user may be enabled to perform one or more of: powering up the Device-Under-Test; powering down the Device-Under-Test; and rebooting the Device-Under-Test. The Device-Under-Test may include one or more of: a storage processor; a disk array; and an IT device. The local communications port on the local computing device may include one or more of: a local serial port; and a local network port. The DUT communications port on the Device-Under-Test may include one or more of: a DUT serial port; and a IPMI network port.

In another implementation, a computing system including a processor and memory is configured to perform operations including associating a local communications port on a local computing device with a DUT communications port on a Device-Under-Test. A user is enabled to remotely access the DUT communications port via the local communications port using a remote computing device.

One or more of the following features may be included. The user may be enabled to schedule access to the DUT communications port on the on Device-Under-Test. An API may be exposed that allows for the interfacing of a test program with the DUT communications port on the on Device-Under-Test. The user may be enabled to perform one or more of: powering up the Device-Under-Test; powering down the Device-Under-Test; and rebooting the Device-Under-Test. The Device-Under-Test may include one or more of: a storage processor; a disk array; and an IT device. The local communications port on the local computing device may include one or more of: a local serial port; and a local network port. The DUT communications port on the Device-Under-Test may include one or more of: a DUT serial port; and a IPMI network port.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
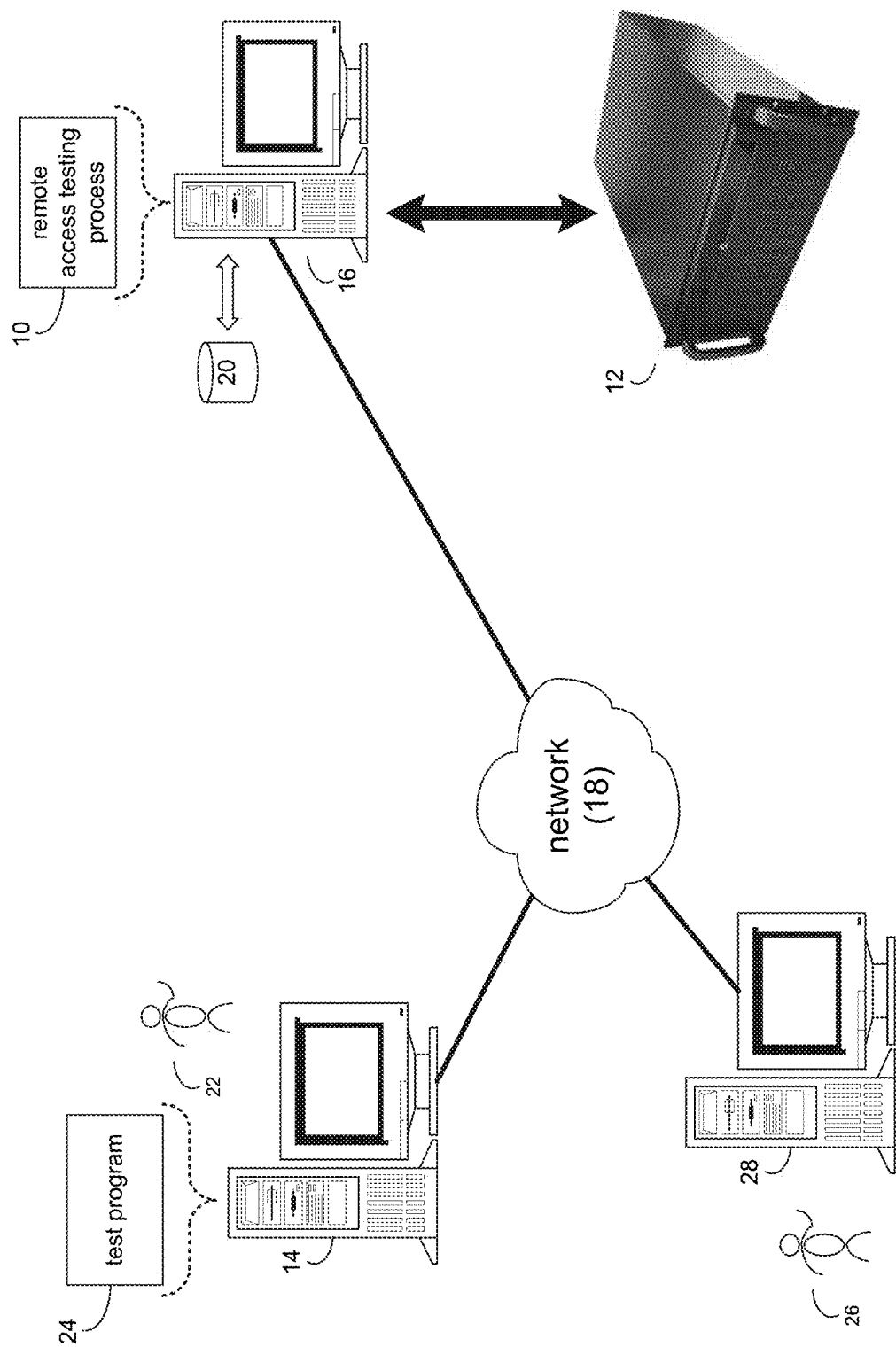
FIG. 1 is a diagrammatic view of a computing system and an remote access testing process 10 coupled to a distributed computing network.

System Overview:

Referring to FIG. 1, there is shown remote access testing process 10. As will be discussed below in greater detail, remote access testing process 10 is a testing tool that allows for remote access to one or more devices-under-test (e.g., device-under-test 12) via remote computing device 14. Remote access testing process 10 may reside on and may be executed by local computing device 16, which may be connected to network 18 (e.g., the Internet or a local area network).

Examples of remote computing device 14 may include, but are not limited to: a personal computer, a laptop computer, a notebook computer, a personal digital assistant, a data-enabled cellular telephone, a server computer, a series of server computers, a mini computer, a mainframe computer, and a dedicated network device. Examples of local computing device 16 may include, but are not limited to: a personal computer, a laptop computer, a notebook computer, a server computer, a series of server computers, a mini computer, a mainframe computer, and a dedicated network device.

The instruction sets and subroutines of remote access testing process 10, which may be stored on storage device 20 coupled to local computing device 16, may be executed by one or more processors (not shown) and one or more memory architectures (not shown) included within local computing device 16. Examples of storage device 20 may include but are not limited to: a hard disk drive; a tape drive; an optical drive; a RAID device; a random access memory (RAM); a read-only memory (ROM); and all forms of flash memory storage devices.

Figure 2:
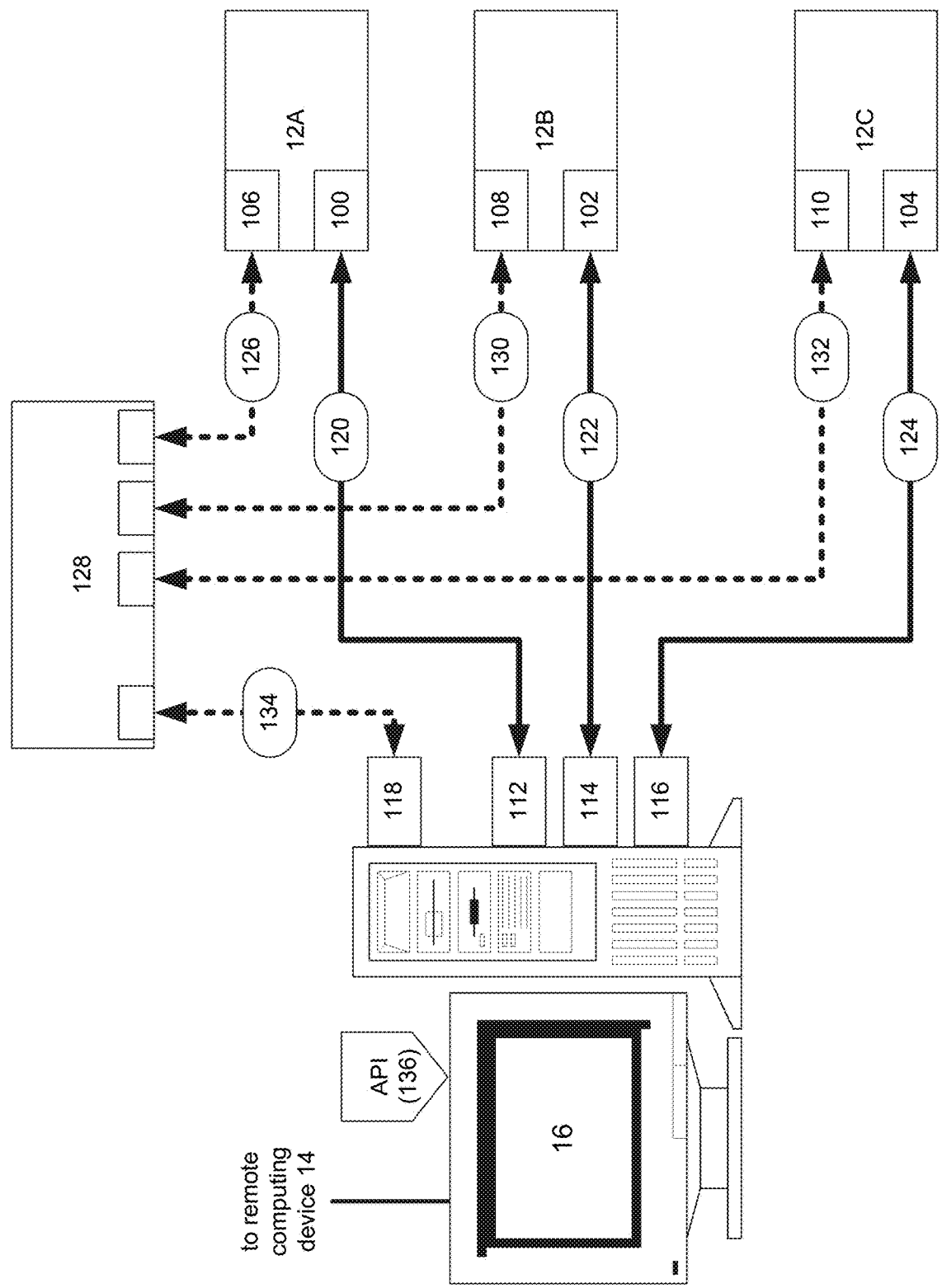
FIG. 2 is a diagrammatic view of devices-under-test coupled to the computing system of FIG. 1.

Referring also to FIG. 2, there is shown one implementation of device-under-test 12. As discussed above, remote access testing process 10 is a testing tool that allows for remote access to one or more devices-under-test (e.g., device-under-test 12) via remote computing device 14. Assume for the following example that remote access testing process 10 is configured to allow remote access to three devices under test (e.g., device-under-test 12A, device-under-test 12B and device-under-test 12C), wherein examples of these devices-under-test may include but is not limited to various computing device, such as storage processors, disk arrays, and other IT device.

Each of device-under-test 12A, device-under-test 12B and device-under-test 12C may include one or more DUT communication ports, examples of which may include but are not limited to DUT serial ports (e.g., DUT serial ports 100, 102, 104, respectively) and IPMI network ports (e.g., IPMI network ports 106, 108, 110, respectively). As is known in the art, IPMI (i.e., Intelligent Platform Management Interface) is a set of computer interface specifications for an autonomous computer subsystem that provides management and monitoring capabilities independently of the host system's CPU, firmware (BIOS or UEFI) and operating system. Local computing device 16 may include one or more local communication ports, examples of which may include but are not limited to local serial ports (e.g., local serial ports 112, 114, 116) and local network ports (e.g., local network port 118).

In this particular implementation, the DUT serial ports (e.g., DUT serial ports 100, 102, 104) of devices-under-test 12A, 12B, 12C (respectively) may be electrically coupled to the local serial ports (e.g., local serial ports 112, 114, 116) of local computing device 16. Accordingly, DUT serial port 100 of device-under-test 12A may be electrically coupled via serial cable 120 to local serial port 112; DUT serial port 102 of device-under-test 12B may be electrically coupled via serial cable 122 to local serial port 114; and DUT serial port 104 of device-under-test 12C may be electrically coupled via serial cable 124 to local serial port 116. Further, IPMI network port 106 of device-under-test 12A may be electrically coupled via network cable 126 to network switch 128; IPMI network port 108 of device-under-test 12B may be electrically coupled via network cable 130 to network switch 128; IPMI network port 110 of device-under-test 12C may be electrically coupled via network cable 132 to network switch 128; and local network port 118 of local computing device 16 may be electrically coupled via network cable 134 to network switch 128.

Figure 3:
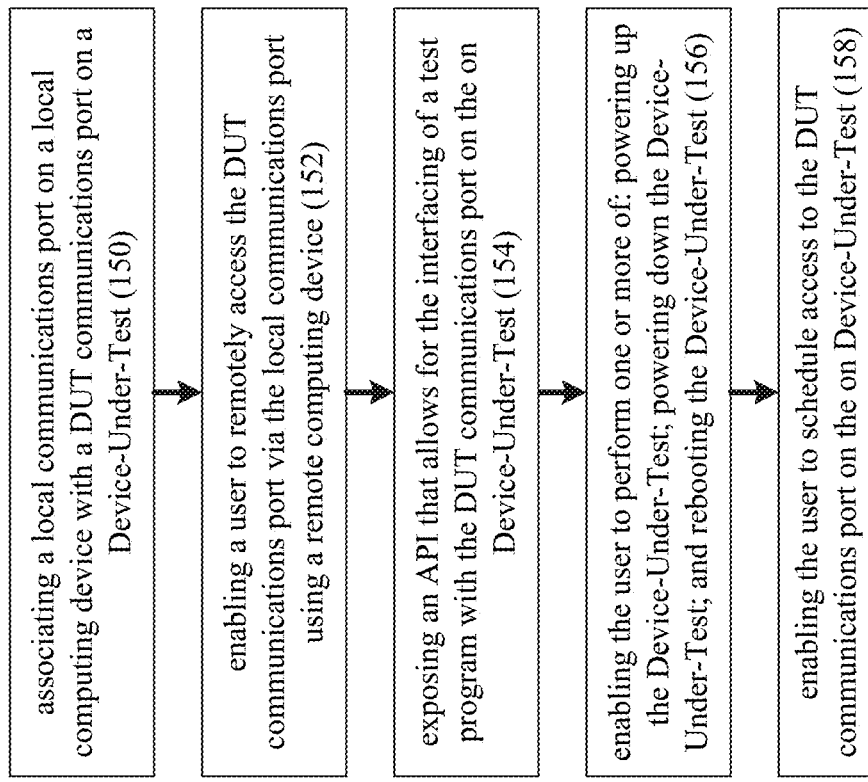
FIG. 3 is a flow chart of the remote access testing process of FIG. 1.

The Remote Access Testing Process:

Referring also to FIG. 3, remote access testing process 10 may be configured to associate 150 a local communications port on local computing device 16 with a DUT communications port on a Device-Under-Test (e.g., device-under-test 12A, device-under-test 12B and/or device-under-test 12C).

Specifically and for this example, assume that remote access testing process 10 associates 150 local serial port 112 on local computing device 16 with DUT serial port 100 on device-under-test 12A. Remote access testing process 10 may also associate 150 local serial port 114 on local computing device 16 with DUT serial port 102 on device-under-test 12B and may associate 150 local serial port 116 on local computing device 16 with DUT serial port 104 on device-under-test 12C. As discussed above, devices-under-test 12A, 12B and 12C may also include IPMI network ports (e.g., IPMI network ports 106, 108, 110, respectively), wherein IPMI network ports 106, 108, 110 may be coupled to local computing device 16 (and local network port 118) via network switch 128 (as opposed to being directly coupled in a point-to-point fashion like the serial ports). Accordingly, remote access testing process 10 may associate 150 local network port 118 with each of IPMI network ports 106, 108, 110 via network switch 128.

Remote access testing process 10 may be configured to enable 152 a user (e.g., user 22) to remotely access the DUT communications port on a Device-Under-Test (e.g., device-under-test 12A, device-under-test 12B and/or device-under-test 12C) via the local communications port on local computing device 16 using a remote computing device (e.g., remote computing device 14).

For example, assume that user 22 is an engineer that is configuring/testing device-under-test 12A, wherein user 22 is in a first location/country and device-under-test 12A is in a second location/country. Accordingly and through the use of remote access testing process 10, user 22 (through remote computing device 14) may be able to provide data to (and read data from) DUT serial port 100 and IPMI network port 106 within device-under-test 12A.

Accordingly and continuing with the above-stated example, remote access testing process 10 may associate 150 local serial port 112 on local computing device 16 with DUT serial port 100 on device-under-test 12A and may associate 150 local network port 118 on local computing device 16 with IPMI network port 106 within device-under-test 12A. Once associated 150, remote access testing process 10 may enable 152 user 22 to remotely access DUT serial port 100 and IPMI network port 106 on device-under-test 12A via local serial port 112 and local network port 118 using remote computing device 14). Accordingly and through the use of remote access testing process 10, user 22 may have access to DUT serial port 100 and IPMI network port 106 on device-under-test 12A even though user 22 is located remotely (in another location/country).

Remote access testing process 10 may be configured to expose 154 an API (e.g., API 136) that allows for the interfacing of a test program (e.g., test program 24) with the DUT communications port (e.g., DUT serial port 100 and/or IPMI network port 106) on the Device-Under-Test (e.g., device-under-test 12A). Examples of test program 24 may include but are not limited to PuTTY (a SHH and TelNet client) and IPMItool (a port probing tool) that may allow user 22 to provide data to (or read data from) the DUT communications port (e.g., local serial port 112 and/or IPMI network port 106). Accordingly and through the use of test program 24 and API 136, user 22 may execute test scripts (not shown) on remote computing 14 that may provide data to (and read data from) DUT serial port 100 and/or IPMI network port 106 on device-under-test 12A via local serial port 112 and local network port 118, thus allowing user 22 to remotely test device-under-test 12A.

Examples of API 136 may include but is not limited to a RESTful interface. As is known in the art, representational state transfer (REST) is an architectural style that includes a coordinated set of architectural constraints applied to components, connectors, and data elements, within a distributed computing system. When an interface conforms to the constraints of REST, those conforming interfaces are said to be RESTful interfaces.

Additionally, remote access testing process 10 may be configured to enable 156 user 22 to perform one or more of administrative-type tasks on (in this example) device-under-test 12A, examples of which may include but are not limited to: powering up device-under-test 12A; powering down device-under-test 12A; and rebooting device-under-test 12A.

Further, assume for illustrative purpose that another user (e.g., user 26) is using another remote computing device (e.g., remote computing device 28) to also configure/test device-under-test 12A. Accordingly and to avoid multiple people (e.g., user 22 and user 26) trying to simultaneously access DUT serial port 100 and/or IPMI network port 106, remote access testing process 10 may be configured to enable 158 the users to schedule access to the DUT communications port (e.g., DUT serial port 100 and/or IPMI network port 106) on device-under-test 12A. For example, if user 22 uses remote access testing process 10 to schedule access to DUT serial port 100 and IPMI network port 106 on device-under-test 12A between the hours of 9:00 a.m. and 12:00 p.m. local time, at 12:01 p.m. remote access testing process 10 may automatically disconnect user 22 from DUT serial port 100 and IPMI network port 106 on device-under-test 12A, thus allowing e.g., user 26 to access DUT serial port 100 and IPMI network port 106 on device-under-test 12A.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 18).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, comprising:
   associating a local communications port on a local computing device with a DUT communications port on a Device-Under-Test;
   enabling a first user to remotely access the DUT communications port via the local communications port using a remote computing device for a pre-designated threshold amount of time;
   executing a first set of one or more test scripts on the remote computing device, wherein executing the first set of one or more test scripts on the remote computing device includes providing data to, and reading data from, at least one of a DUT serial port and an Intelligent Platform Management Interface (IPMI) network port on the Device-Under-Test via a local serial port and a local network port;
   automatically disconnecting the first user from the DUT communications port when the pre-designated threshold amount of time expires; and
   allowing a second user to access the DUT communications port to execute a second set of one or test scripts on the remote computing device, wherein executing the second set of one or more test scripts on the remote computing device includes providing data to, and reading data from, at least one of a DUT serial port and an IPMI network port on the Device-Under-Test via a local serial port and a local network port.

2. The computer-implemented method of claim 1 further comprising:
   exposing an API that allows for the interfacing of a test program with the DUT communications port on the on Device-Under-Test.

3. The computer-implemented method of claim 1 further comprising:
   enabling one or more of the first user and the second user to perform one or more of:
   powering up the Device-Under-Test;
   powering down the Device-Under-Test; and
   rebooting the Device-Under-Test.

4. The computer-implemented method of claim 3 wherein the Device-Under-Test includes one or more of:
   a storage processor;
   a disk array; and
   an IT device.

5. The computer-implemented method of claim 1 wherein the local communications port on the local computing device includes one or more of:
   the local serial port; and
   the local network port.

6. The computer-implemented method of claim 1 wherein the DUT communications port on the Device-Under-Test includes one or more of:
   the DUT serial port; and
   the IPMI network port.

7. A computer program product residing on a non-transitory computer readable medium having a plurality of instructions stored thereon which, when executed by a processor, cause the processor to perform operations comprising:
   associating a local communications port on a local computing device with a DUT communications port on a Device-Under-Test;
   enabling a first user to remotely access the DUT communications port via the local communications port using a remote computing device for a pre-designated threshold amount of time;
   executing a first set of one or more test scripts on the remote computing device, wherein executing the first set of one or more test scripts on the remote computing device includes providing data to, and reading data from, at least one of a DUT serial port and an Intelligent Platform Management Interface (IPMI) network port on the Device-Under-Test via a local serial port and a local network port;
   automatically disconnecting the first user from the DUT communications port when the pre-designated threshold amount of time expires; and
   allowing a second user to access the DUT communications port to execute a second set of one or test scripts on the remote computing device, wherein executing the second set of one or more test scripts on the remote computing device includes providing data to, and reading data from, at least one of a DUT serial port and an IPMI network port on the Device-Under-Test via a local serial port and a local network port.

8. The computer program product of claim 7 further comprising instructions for:
   exposing an API that allows for the interfacing of a test program with the DUT communications port on the on Device-Under-Test.

9. The computer program product of claim 7 further comprising instructions for:
   enabling one or more of the first user and the second user to perform one or more of:
   powering up the Device-Under-Test;
   powering down the Device-Under-Test; and
   rebooting the Device-Under-Test.

10. The computer program product of claim 9 wherein the Device-Under-Test includes one or more of:
    a storage processor;
    a disk array; and
    an IT device.

11. The computer program product of claim 7 wherein the local communications port on the local computing device includes one or more of:
    the local serial port; and
    the local network port.

12. The computer program product of claim 7 wherein the DUT communications port on the Device-Under-Test includes one or more of:
    the DUT serial port; and
    the IPMI network port.

13. A computing system including a hardware processor and memory configured to perform operations comprising:
    associating a local communications port on a local computing device with a DUT communications port on a Device-Under-Test;
    enabling a first user to remotely access the DUT communications port via the local communications port using a remote computing device for a pre-designated threshold amount of time;
    executing a first set of one or more test scripts on the remote computing device, wherein executing the first set of one or more test scripts on the remote computing device includes providing data to, and reading data from, at least one of a DUT serial port and an Intelligent Platform Management Interface (IPMI) network port on the Device-Under-Test via a local serial port and a local network port;
    automatically disconnecting the first user from the DUT communications port when the pre-designated threshold amount of time expires; and
    allowing a second user to access the DUT communications port to execute a second set of one or test scripts on the remote computing device, wherein executing the second set of one or more test scripts on the remote computing device includes providing data to, and reading data from, at least one of a DUT serial port and an IPMI network port on the Device-Under-Test via a local serial port and a local network port.

14. The computing system of claim 13 further configured to perform operations comprising:
    exposing an API that allows for the interfacing of a test program with the DUT communications port on the on Device-Under-Test.

15. The computing system of claim 13 further configured to perform operations comprising:
    enabling one or more of the first user and the second user the user to perform one or more of:
    powering up the Device-Under-Test;
    powering down the Device-Under-Test; and
    rebooting the Device-Under-Test.

16. The computing system of claim 15 wherein the Device-Under-Test includes one or more of:
    a storage processor;
    a disk array; and
    an IT device.

17. The computing system of claim 13 wherein the local communications port on the local computing device includes one or more of:
    the local serial port; and
    the local network port.

18. The computing system of claim 13 wherein the DUT communications port on the Device-Under-Test includes one or more of:
    the DUT serial port; and
    the IPMI network port.

* * * * *